US012564784B2

(12) United States Patent (10) Patent No.: US 12,564,784 B2
Chen et al. (45) Date of Patent: Mar. 3, 2026

(54) HAPTIC CONTROL METHOD AND APPARATUS, ELECTRONIC DEVICE, AND COMPUTER-READABLE STORAGE MEDIUM

(71) Applicant: TENCENT TECHNOLOGY (SHENZHEN) COMPANY LIMITED, Shenzhen (CN)

(72) Inventors: Jingjing Chen, Shenzhen (CN); Haiyang Wu, Shenzhen (CN); Kai Hong, Shenzhen (CN); Shili Xu, Shenzhen (CN); Qitian Zhang, Shenzhen (CN); Zhuan Liu, Shenzhen (CN); Huixia Cao, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 189 days.

(21) Appl. No.: 18/163,950

(22) Filed: Feb. 3, 2023

(65) Prior Publication Data

US 2023/0182010 A1 Jun. 15, 2023

Related U.S. Application Data

(63) Continuation of application No. PCT/CN2021/016837, filed on Sep. 7, 2021.

(30) Foreign Application Priority Data

Sep. 18, 2020 (CN) .......................... 202010985361.1
Jul. 5, 2021 (CN) .......................... 202110758549.7

(51) Int. Cl.
*A63F 13/285* (2014.01)

(52) U.S. Cl.
CPC ................................... *A63F 13/285* (2014.09)

(58) Field of Classification Search
CPC ...................................................... A63F 13/285
(Continued)

(56) References Cited

U.S. PATENT DOCUMENTS

2014/0092003 A1 4/2014 Liu
2018/0004291 A1* 1/2018 Dauhajre ................ H04L 67/01
(Continued)

FOREIGN PATENT DOCUMENTS

CN 1914583 A 2/2007
CN 104915125 A 9/2015
(Continued)

OTHER PUBLICATIONS

Extended European Search Report dated Sep. 28, 2023 in Application No. 21868502.2.
(Continued)

*Primary Examiner* — Kam Wan Ma
(74) *Attorney, Agent, or Firm* — Sughrue Mion, PLLC

(57) ABSTRACT

A haptic control approach including: obtaining haptic support information of a target device, obtaining target haptic description information, the target haptic description information being used to describe a haptic special effect in a target scenario, performing conversion processing on the target haptic description information according to the haptic support information to obtain target haptic execution information, and transmitting the target haptic execution information to the target device, so that the target device vibrates according to the target haptic execution information.

19 Claims, 7 Drawing Sheets

(58) Field of Classification Search
USPC ........................................................ 340/407.1
See application file for complete search history.

(56) References Cited

U.S. PATENT DOCUMENTS

| | | |
|---|---|---|
| 2018/0093178 A1 | 4/2018 | Heubel et al. |
| 2019/0258328 A1 | 8/2019 | Venkatesan et al. |

FOREIGN PATENT DOCUMENTS

| | | |
|---|---|---|
| CN | 108837504 A | 11/2018 |
| CN | 110010151 A | 7/2019 |
| CN | 110215697 A | 9/2019 |
| CN | 111111157 A | 5/2020 |
| CN | 111352509 A | 6/2020 |
| CN | 112121411 A | 12/2020 |
| EP | 3 264 230 A1 | 1/2018 |
| EP | 3 462 285 A1 | 4/2019 |
| EP | 2 911 039 B1 | 8/2019 |

OTHER PUBLICATIONS

International Search Report for PCT/CN2021/116837 dated Nov. 26, 2021 (PCT/ISA/210).
Office Action issued Sep. 17, 2025 in CN Application No. 202310559607.2.

* cited by examiner

100

200

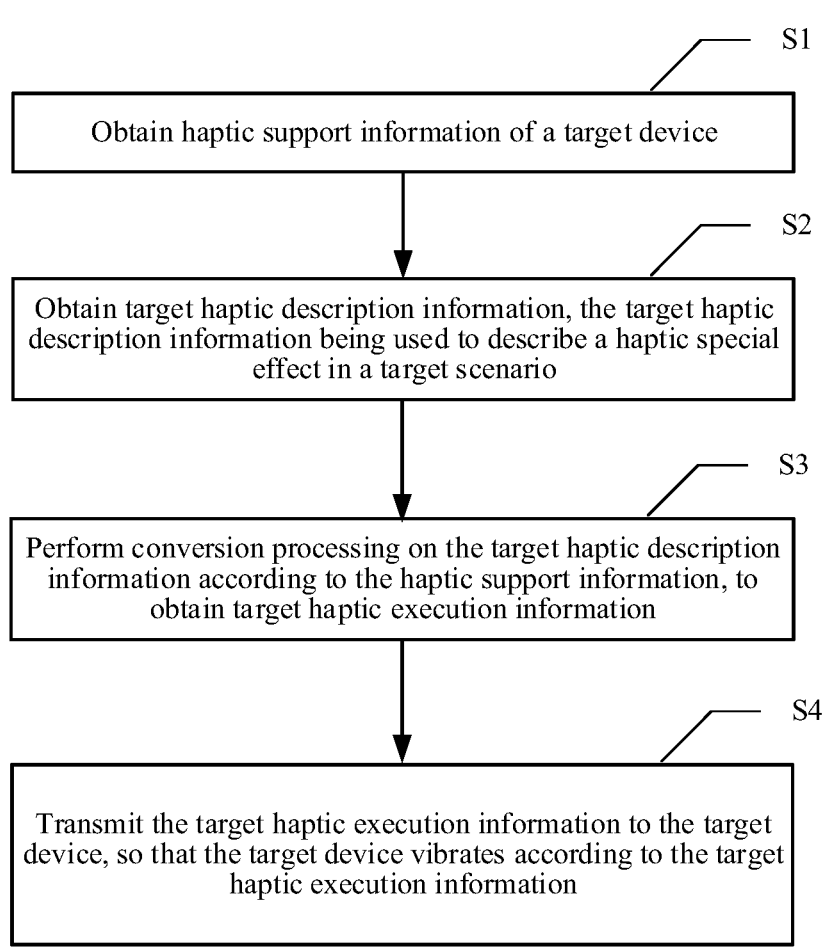

S1

Obtain haptic support information of a target device

S2

Obtain target haptic description information, the target haptic description information being used to describe a haptic special effect in a target scenario

S3

Perform conversion processing on the target haptic description information according to the haptic support information, to obtain target haptic execution information

S4

Transmit the target haptic execution information to the target device, so that the target device vibrates according to the target haptic execution information

FIG. 3

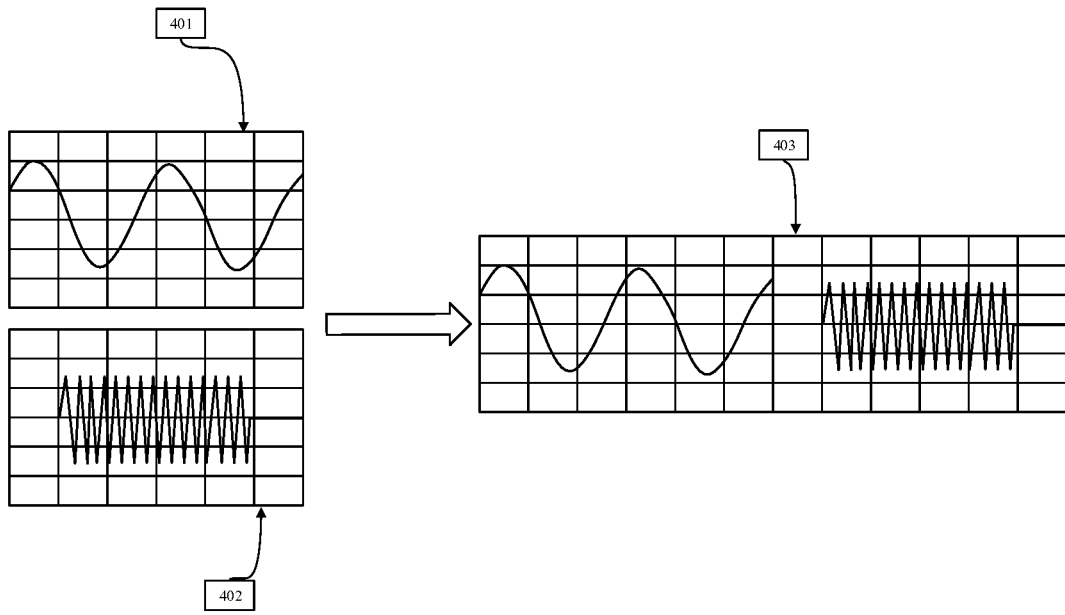

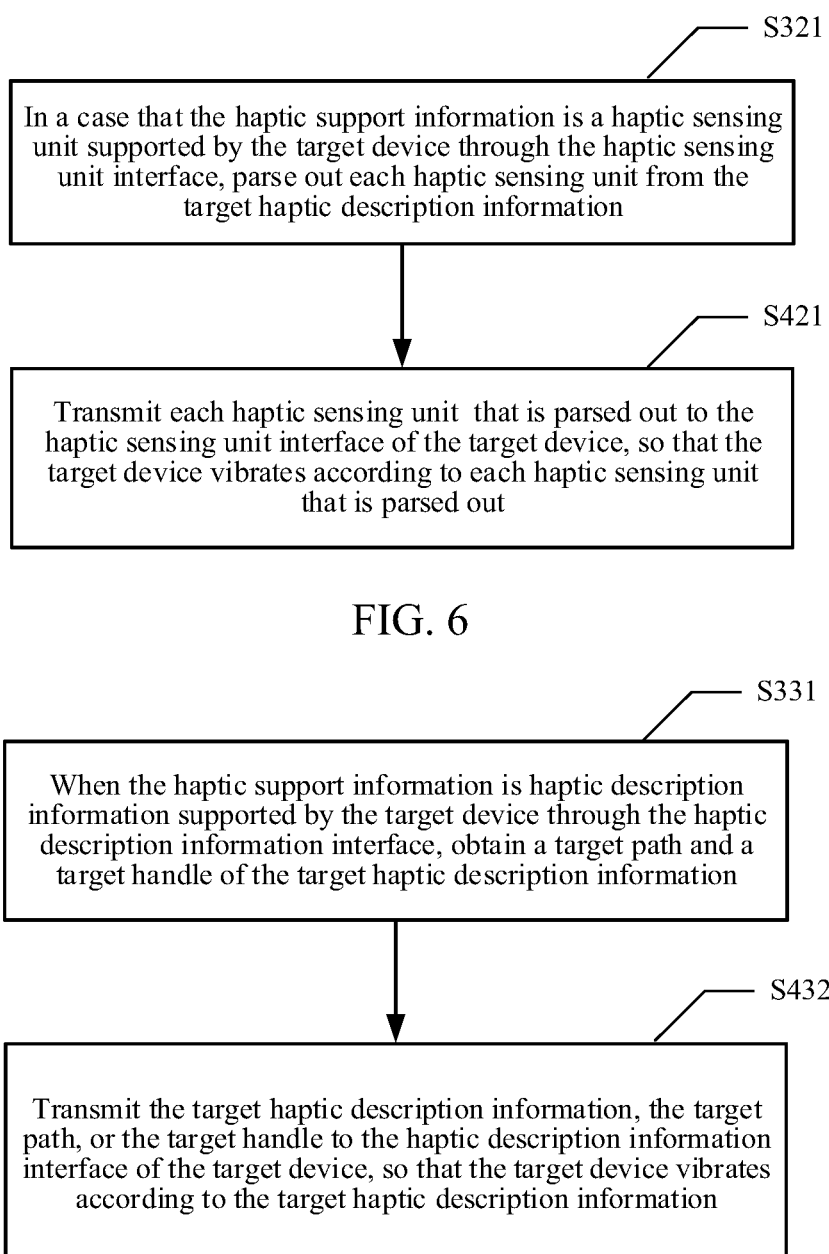

S321

In a case that the haptic support information is a haptic sensing unit supported by the target device through the haptic sensing unit interface, parse out each haptic sensing unit from the target haptic description information

S421

Transmit each haptic sensing unit that is parsed out to the haptic sensing unit interface of the target device, so that the target device vibrates according to each haptic sensing unit that is parsed out

When the haptic support information is haptic description information supported by the target device through the haptic description information interface, obtain a target path and a target handle of the target haptic description information

S432

Transmit the target haptic description information, the target path, or the target handle to the haptic description information interface of the target device, so that the target device vibrates according to the target haptic description information

FIG. 7

HAPTIC CONTROL METHOD AND APPARATUS, ELECTRONIC DEVICE, AND COMPUTER-READABLE STORAGE MEDIUM

CROSS-REFERENCE TO RELATED APPLICATIONS

This application is a continuation application of International Application No. PCT/CN2021/116837, filed on Sep. 7, 2021, which claims priority to Chinese Patent Application No. 202110758549.7, filed with the China National Intellectual Property Administration on Jul. 5, 2021, which claims priority to Chinese Patent Application No. 202010985361.1 filed with the China National Intellectual Property Administration on Sep. 18, 2020, the disclosures of each of which are incorporated by reference in their entireties.

FIELD

The present disclosure relates to the field of computer and Internet technologies, and in particular, to a haptic control method and apparatus, an electronic device, and a computer-readable storage medium.

BACKGROUND

At present, most smart devices already support haptic effects, and haptic effects of devices can bring richer touch effects to games and greatly expand game interaction experience.

Due to the wide variety of systems and hardware of smart terminals, in a game haptic scenario, a haptic special effect currently may only be used for the same hardware device and the same platform, and the same haptic effect cannot be adapted to different hardware devices and different platforms. That is, there is a problem that devices are incompatible with a haptic effect.

It should be noted that the information disclosed in the background only serves to enhance understanding of the background of the disclosure.

SUMMARY

According to various embodiments a haptic control method, executed by an electronic device, may include: obtaining haptic support information of a target device; obtaining target haptic description information, the target haptic description information being used to describe a haptic special effect in a target scenario; performing conversion processing on the target haptic description information according to the haptic support information, to obtain target haptic execution information; and transmitting the target haptic execution information to the target device, so that the target device vibrates according to the target haptic execution information.

According to various embodiments, a haptic control apparatus, a non-transitory computer-readable storage medium, a computer device, and a computer program product or a computer program consistent with the haptic control method may also be provided.

In the haptic control method and apparatus, the electronic device, and the computer-readable storage medium provided by some embodiments, the target haptic description information is processed based on the haptic support information of the target device to obtain the target haptic execution information adapted to the target device, and then a target haptic interface of the target device is called according to the target haptic execution information, so that the target device vibrates to achieve a haptic special effect. According to the technical solutions provided by the disclosure, the target haptic description information may be processed according to the haptic support information of different devices, to obtain haptic execution information adapted to haptic interfaces of the devices, so that the different devices can achieve the same haptic special effect.

It is to be understood that the foregoing general descriptions and the following detailed descriptions are only exemplary, and are not intended to limit the disclosure.

BRIEF DESCRIPTION OF THE DRAWINGS

To describe the technical solutions of example embodiments of this disclosure more clearly, the following briefly introduces the accompanying drawings for describing the example embodiments. The accompanying drawings in the following description show only some embodiments of the disclosure, and a person of ordinary skill in the art may still derive other drawings from these accompanying drawings without creative efforts. In addition, one of ordinary skill would understand that aspects of example embodiments may be combined together or implemented alone.

FIG. 3 is a flowchart of a haptic control method according to some embodiments;

FIG. 4 is a schematic diagram of a haptic effect according to some embodiments;

FIG. 6 is a flowchart of a haptic control method according to some embodiments;

FIG. 7 is a flowchart of a haptic control method according to some embodiments;

DESCRIPTION OF EMBODIMENTS

Figure 1:
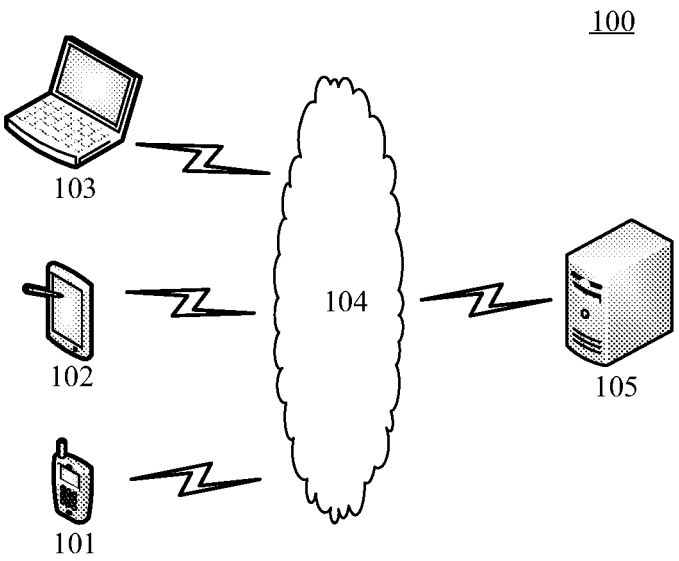
FIG. 1 is a schematic diagram of an exemplary system architecture of a haptic control method or a haptic control apparatus that can be applied to some embodiments.

To make the objectives, technical solutions, and advantages of the present disclosure clearer, the following further describes the present disclosure in detail with reference to the accompanying drawings. The described embodiments are not to be construed as a limitation to the present disclosure. All other embodiments obtained by a person of ordinary skill in the art without creative efforts shall fall within the protection scope of the present disclosure.

In the following descriptions, related "some embodiments" describe a subset of all possible embodiments. However, it may be understood that the "some embodiments" may be the same subset or different subsets of all the possible embodiments, and may be combined with each other without conflict.

The features, structures, or characteristics described in the disclosure may be combined in one or more implementations in any suitable manner. In the following description, many specific details are provided to give a full understanding of the implementations of the disclosure. However, it is to be appreciated by a person skilled in the art that one or more of the specific details may be omitted during practice of the technical solutions of the disclosure, or other methods, components, apparatus, operations, or the like may be used. In other cases, well-known methods, apparatuses, implementations, or operations are not shown or described in detail, in order not to obscure the aspects of the disclosure.

The accompanying drawings are only schematic illustrations of the disclosure. A same reference numeral in the accompanying drawings represents same or similar parts, and therefore repeated descriptions thereof are omitted. Some of the block diagrams shown in the accompanying drawings do not necessarily correspond to physically or logically independent entities. Such functional entities may be implemented by using software, or implemented in one or more hardware modules or integrated circuits, or implemented in different networks and/or processor apparatuses and/or micro-controller apparatuses.

The flowcharts shown in the accompanying drawings are merely examples for descriptions, do not necessarily include all content and operations, and are not necessarily performed in the described orders. For example, some operations may further be decomposed, and some operations may be merged or partially merged. As a result, an actual execution order may be changed according to an actual situation.

In this specification, the terms "a", "an", "the", "said", and "at least one" are used to mean the presence of one or more elements/components/or the like. The terms "comprise", "include", and "have" are used to indicate an open-ended inclusive meaning and indicate that additional elements/components/or the like may be present in addition to the listed elements/components/or the like. The terms "first", "second", and "third" are used only as labels and are not intended to limit a number of objects.

The following describes some embodiments in detail with reference to the accompanying drawings.

FIG. 1 is a schematic diagram of an exemplary system architecture of a haptic control method or a haptic control apparatus that can be applied to some embodiments of the disclosure.

As shown in FIG. 1, the system architecture 100 may include terminal devices 101, 102 and 103, a network 104 and a server 105. The network 104 is configured to provide a medium of a communication link between the terminal devices 101, 102, and 103 and the server 105. The network 104 may include various connection types, such as a wired or wireless communication link, a fiber optic cable, or the like.

A user may use the terminal devices 101, 102, and 103 to interact with the server 105 through the network 104 to receive or send a message or the like. The terminal devices 101, 102 and 103 may be various electronic devices with a display screen and supporting web browsing, including, but not limited to, smartphones, tablet computers, laptop portable computers, desktop computers, wearable devices, virtual reality devices, smart homes and the like.

The server 105 may be a server that provides various services, such as a background management server that provides support for an apparatus operated by the user with the terminal devices 101, 102, and 103. The background management server can process such as analyze data such as a received request and feed back a processing result to the terminal device.

The server 105 may, for example, obtain haptic support information of a target device. The server 105 may, for example, obtain target haptic description information, the target haptic description information being used to describe a haptic special effect in a target scenario. The server 105 may, for example, perform conversion processing on the target haptic description information according to the haptic support information, to obtain target haptic execution information. The server 105 may, for example, transmit the target haptic execution information to the target device, so that the target device vibrates according to the target haptic execution information.

It is understood that numbers of terminal devices, networks, and servers in FIG. 1 are only illustrative, and the server 105 may be one physical server, or may include multiple servers. There may be any number of terminal devices, networks, and servers according to actual requirements.

Figure 2:
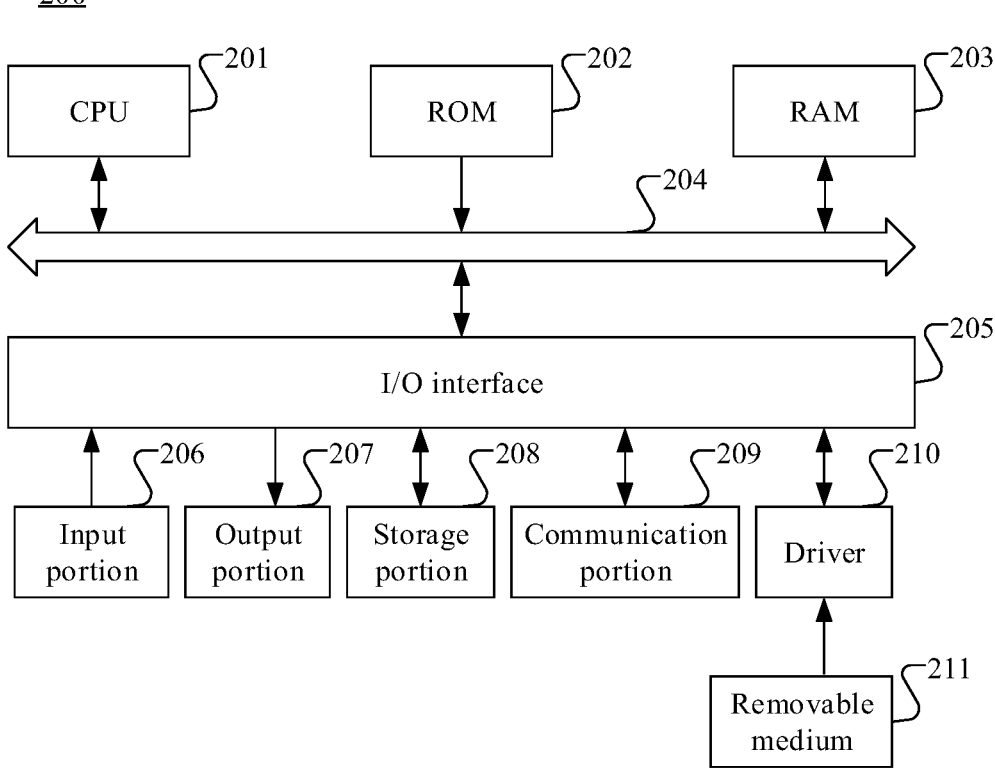
FIG. 2 is a schematic structural diagram of a computer system applied to a haptic control apparatus according to some embodiments.

Then, refer to FIG. 2. FIG. 2 is a schematic structural diagram of a computer system 200 suitable for implementing a terminal device according to some embodiments. The terminal device shown in FIG. 2 is only an example, and imposes no limitation on functions and usage scope of some embodiments.

As shown in FIG. 2, the computer system 200 includes a central processing unit (CPU) 201, which may perform various proper actions and processing based on computer-readable instructions stored in a read-only memory (ROM) 202 or computer-readable instructions loaded from a storage part 208 into a random access memory (RAM) 203. The RAM 203 further stores various computer-readable instructions and data required for operations of the system 200. The CPU 201, the ROM 202, and the RAM 203 are connected to each other by using a bus 204. An input/output (I/O) interface 205 is also connected to the bus 204.

The following components are connected to the I/O interface 205: an input portion 206 including a keyboard, a mouse, or the like; an output part 207 including a cathode ray tube (CRT), a liquid crystal display (LCD), and a speaker, and the like; a storage part 208 including hard disk and the like; and a communication part 209 including a network interface card such as an LAN card, a modem, and the like. The communication part 209 performs communication processing by using a network such as the Internet. A driver 210 is also connected to the I/O interface 205 as required. A removable medium 211, such as a magnetic disk, an optical disc, a magneto-optical disk, or a semiconductor memory, is installed on the driver 210 as required, so that computer-readable instructions read from the removable medium is installed into the storage part 208 as required.

Particularly, according to some embodiments, the processes described in the following by referring to the flowcharts may be implemented as a computer software program. For example, some embodiments includes a computer program product. The computer program product includes a computer program carried in a computer-readable storage medium. The computer program includes a program code used for performing the methods shown in the flowcharts. In such an embodiment, by using the communication part 209, the computer program may be downloaded and installed from a network, and/or installed from the removable medium 211. When the computer program is executed by the central processing unit (CPU) 201, the above functions defined in the system of this application are performed.

It should be noted that the computer-readable storage medium may be a computer-readable signal medium or a computer-readable storage medium or any combination of the two. The computer-readable storage medium may be, for example, but is not limited to, an electric, magnetic, optical, electromagnetic, infrared, or semi-conductive system, apparatus, or device, or any combination of the above. A more specific example of the computer-readable storage medium may include, but is not limited to: an electrical connection with one or more wires, a portable computer disk, a hard disk, a random access memory (RAM), a read-only memory (ROM), an erasable programmable read-only memory (EPROM or a flash memory), an optical fiber, a portable compact disc read-only memory (CD-ROM), an optical storage device, a magnetic storage device, or any suitable combination of the above. The computer-readable storage medium may be any tangible medium containing or storing computer-readable instructions, and the computer-readable instructions may be used by or used in combination with an instruction execution system, an apparatus, or a device. The computer-readable signal medium may include a data signal transmitted in a baseband or as part of a carrier, and carries a computer-readable instruction code. The propagated data signal may be in a plurality of forms, including, but not limited to, an electromagnetic signal, an optical signal, or any appropriate combination thereof. The computer-readable signal medium may alternatively be any computer-readable storage medium other than the computer-readable storage medium. The computer-readable storage medium may send, propagate, or transmit computer-readable instructions used by or in combination with an instruction execution system, apparatus, or device. The computer-readable instruction code contained in the computer-readable storage medium may be transmitted by using any appropriate medium, including but not limited to: a wireless medium, a wire, an optical cable, RF, any suitable combination thereof, or the like.

The flowcharts and block diagrams in the accompanying drawings illustrate possible system architectures, functions and operations that may be implemented by a system, a method, and a computer program product according to various embodiments of the disclosure. In this regard, each box in the flowchart or the block diagram may represent a module, a program segment, or a part of code. The module, the program segment, or the part of code includes one or more executable instructions used for implementing specified logic functions. It should also be noted that in some implementations used as substitutes, functions annotated in boxes may alternatively occur in a sequence different from that annotated in an accompanying drawing. For example, two boxes shown in succession may actually be performed basically in parallel, and sometimes the two boxes may be performed in a reverse sequence. This is determined by a related function. It should also be noted that each block in the block diagram or the flowchart, and a combination of blocks in the block diagram or the flowchart may be implemented by using a dedicated hardware-based system that performs a specified function or operation, or may be implemented by using a combination of dedicated hardware and computer instructions.

The modules and/or units described in some embodiments may be implemented by means of software or hardware. The described modules and/or units may also be provided in a processor, which, for example, may be described as: a processor includes a sending unit, an obtaining unit, a determining unit, and a first processing unit. Names of the modules and/or units do not constitute a limitation on the modules and/or units in a specific case.

Some embodiments may provide a computer-readable storage medium, where the computer-readable storage medium may be included in the device described in the foregoing embodiments, or may exist alone without being assembled into the device. The computer-readable storage medium carries one or more computer-readable instructions, and when the one or more computer-readable instructions are executed by a device, the device may be caused to implement functions as follows: obtaining haptic support information of a target device; obtaining target haptic description information, the target haptic description information being used to describe a haptic special effect in a target scenario; performing conversion processing on the target haptic description information according to the haptic support information, to obtain target haptic execution information; and transmitting the target haptic execution information to the target device, so that the target device vibrates according to the target haptic execution information.

With the development of smart terminal devices, more and more devices support haptic effects, and vibration can bring richer touch effects to games and greatly expand game interaction experience. However, for current devices, haptic interfaces of different devices may be different (names and parameters of interfaces may not be uniform). Besides, different devices may support different haptic effects (some devices only support adjustment of haptic intensity, and some devices can support adjustment of complex haptic effects such as haptic intensity, haptic sharpness, and haptic decay time).

At present, different developments need to be performed for different devices, so that the same game can achieve the same haptic effect in the different devices, which greatly wastes manpower and material resources and results in high costs.

This application provides a haptic method that can control vibration of a target device according to target haptic description information describing a haptic special effect of a target scenario, so that different devices can achieve the same target haptic effect.

FIG. 3 is a flowchart of a haptic control method according to some embodiments. The method provided in some embodiments may be processed by any electronic device with a computing processing capability, such as the server 105 and/or the terminal devices 102 and 103 in the embodiment of FIG. 1. In the following embodiments, the terminal devices 101 and 102 are used as an execution body for illustration, but this application is not limited thereto.

Referring to FIG. 3, the haptic control method provided by some embodiments may include the following operations.

Operation S1: Obtain haptic support information of a target device.

In some embodiments, the target device may be any device that needs haptic control, such as a mobile phone, a gamepad, or a smart helmet.

In some embodiments, the haptic support information may be target haptic interface information in the target device and parameter support information of a target haptic interface. For example, target haptic interfaces of some target devices may be provided by motor providers (businesses that provide motors), and the interfaces may support specific haptic parameters (for example, specific parameter values such as a haptic sharpness of XX Hz or a haptic time of XX seconds). For example, target haptic interfaces of some target devices may be provided by target service systems (such as Android system) on the target devices, and the interfaces may support specific haptic parameters (for example, specific parameter values such as a haptic sharpness of XX Hz), and may also support information such as haptic description information that abstractly describes haptic special effects in a target application scenario. Some interfaces may support fewer haptic parameters (for example, only support relatively simple haptic function parameters such as a haptic time and a haptic intensity). Some interfaces may support more complex and diverse haptic parameters.

Operation S2: Obtain target haptic description information, the target haptic description information being used to describe a haptic special effect in a target scenario.

In some embodiments, the target haptic description information may be information that describes the haptic special effect in the target scenario. The target scenario may be any scenario that requires a haptic effect, such as a wonderful scenario in a game, a message prompt scenario of an application, or a call prompt scenario of a smartphone.

In some embodiments, the target haptic description information may be in a character string form or a text form, for example, may be a text form such as javascript object notation (JOSON), a yml format, and an xml format.

In some embodiments, the haptic special effect in the target scenario may be described by a specific parameter value (for example, a haptic sharpness of XX Hz and a haptic time of XX seconds), or an abstract parameter (for example, a haptic sharpness of XX level and a haptic intensity of XX level).

In some target applications, to express richer haptic sensations, multiple haptic effects often need to be combined. In some embodiments, a haptic effect 401 (a first haptic sharpness) and a haptic effect 402 (a second haptic sharpness) as shown in FIG. 4 may need to be combined to achieve a haptic effect 403.

Therefore, the target haptic description information provided in some embodiments may include multiple haptic units, and each haptic unit may describe a haptic effect, so that the haptic description information may include more complex and diverse haptic effects. For example, the target haptic description information may include a haptic unit that may describe a continuous haptic effect, a haptic unit that may describe a transient haptic effect, and a haptic unit that may first describe a rapid vibration and then describe a slow vibration.

In some embodiments, the following cases are used to describe the target haptic description information.

Haptic effect (HE) //HE is a game haptic effect description text in a json format.

```
{
   "Metadata": {
      "Version": 1,                                          // version number
      "Created": "2020-07-08",                               // created time
      "Description": "game haptic"                           // haptic effect description
   },
   "Pattern":
   [
      {
         "Event": {
            "EventType": "continuous",                       // event type:
continuous->continuois vibration, transient->transient vibration (which may be replaced with
self-defined continuous vibration)
            "EventTime": 0.0,                                // relative start time, number of
floating points, in unit of seconds
            "EventDuration": 0.3,                            // duration, number of floating
points, in unit of seconds
            "Parameters": {
               "Intensity": 0.8,                             // haptic intensity, 0-1
               "Sharpness": 0.9,                             // haptic sharpness, 0-1
               "Attacktime": 0.1,                            // time taken to reach full
intensity, 0-1
               "Decaytime" 0.2,                              // decay time, 0-1
               "Curve": [                                    //curve parameter, smooth
transition is ensured
                  {"Time": 0.1, "Intensity": 0.7},                   // adjust
intensity to 0.7 at a relative time 0.1s
                  {"Time": 0.1, "Sharpness": 0.8},                   // adjust
sharpness to 0.8 at a relative time 0.1s
                  {"Time": 0.2, "Intensity": 0.75},
                  {"Time": 0.2, "Sharpness": 0.9}
```

```
            ]
         }
      }
   },
   {
      "Event": {
         "EventType": "continuous",                          // event type:
continuous->continuous vibration, transient->transient vibration
         "EventTime": 0.1,                                   // relative start time, number of
floating points, in unit of seconds
         "EventDuration": 0.5,                               // duration, number of floating
```

-continued

```
points, in unit of seconds
      "Parameters": {
          "Intensity": 0.6,              // haptic intensity, 0-1
          "Sharpness": 0.5,             // haptic sharpness, 0-1
          "Attacktime": 0.2,            // time taken to reach full
intensity, 0-1
          "Decaytime": 0.3,             // decay time, 0-1
          "Curve": [
              {"Time": 0.1, "Intensity": 0.7}
              {"Time": 0.1, "Sharpness": 0.8}
              {"Time": 0.2, "Intensity": 0.75}
              {"Time": 0.2, "Sharpness": 0.9}
          ]
      }
   }
},
```

Details are as follows:

An HE file includes two parts:

(1) The metadata field includes basic information such as a haptic effect version, a created time, and a haptic effect description.

(2) A specific haptic effect is described by the pattern field, and content of the pattern field is one or more event arrays. Each event describes a haptic unit (each haptic unit may be used to describe a haptic effect).

The event haptic unit may include the following:

(a) EventType describes a haptic effect type.

(b) EventTime, relative start time, number of floating points, in unit of seconds (c) EventDuration, duration, number of floating points, in unit of seconds (d) The parameters field includes a haptic intensity, a haptic sharpness, a time taken to achieve full vibration, a decay time, and the like.

(e) Curve is used to describe a dynamic haptic effect curve, and is used to achieve smooth transition of a dynamic change effect.

(f) Haptic effect parameter values are all abstract from 0 to 1, 0 is the minimum value supported by the platform, and 1 is the maximum value supported by the platform.

In some other embodiments, the following cases may be alternatively used to describe the target haptic description information. However, this is not limited in the present disclosure.

```
"Metadata": {       // Metadata is used to describe basic haptic information.
      "Version": 1,       // version
      "Created": "2020-07-08",   // created time
      "Description": "game haptic"   // description
   },
   "Pattern":       // Pattern describes a specific haptic effect, and includes
one or more events .
```

```
[
   {
      "Event": { // Each event describes a haptic effect unit, without
overlapping.
          "Type": "continuous", // Type describes a haptic effect type,
including two types: a continuous vibration type "continuous " and a
transient vibration type "transient".
          "RelativeTime": 0, // relative start time, integer, in unit of
microseconds
          "Duration": 300, // duration, integer, in unit of microseconds
          "Parameters": { // Parameters include a haptic intensity and a
haptic frequency, with a value range of [0, 100].
```

-continued

```
          "Intensity": 80,
          "Frequency": 50,
```

"Curve": [ //Curve is an array parameter of an effect curve, and is used to describe a dynamic haptic effect curve of continuous vibration and achieve smooth transition of a dynamic change effect. A start point and an end point are required, where a frequency value is adjustable. There is an optional control point in the middle, where frequency and intensity values are adjustable. Time in "Curve" is relative time of an event. Intensity is used to modify Intensity in Parameters, with a value range of [0, 1], and is multiplied by Intensity in Parameters. Frequency is used to modify Frequency in Parameters, with a value range of [−Frequency, 100−Frequency], and is added to Frequency in Parameters. A final value of Frequency is within [0, 100].

```
          {"Time": 0, "Intensity": 0, "Frequency": 25},
          {"Time": 100, "Intensity": 0.7, "Frequency": −30},
          {"Time": 300, "Intensity": 0, "Frequency": 50}
          ]
      } } },
   {
      "Event": {
          "Type": "transient",
          "RelativeTime": 400,
          "Parameters": {
             "Intensity": 80,
             "Frequency": 40
             "Curve": [
                {"Time": 0, "Intensity": 0, "Frequency": 25},
                {"Time": 100, "Intensity": 0.7, "Frequency": −30},
                {"Time": 300, "Intensity": 0, "Frequency": 50}
             ]
          } }},
      ]
   }
```

On the one hand, the haptic description information provided in some embodiments may describe the haptic special effect of the target application (for example, a target game) in the target scenario in a relatively abstract manner, so as to ensure that each device may achieve the haptic special effect described in the haptic description information. On the other hand, the haptic unit in the haptic description information may be reused, which greatly saves development resources.

Operation S3: Perform conversion processing on the target haptic description information according to the haptic support information, to obtain target haptic execution information.

In some embodiments, conversion processing may be performed on the target haptic description information according to the haptic support information of the target device, to obtain target haptic execution information.

For example, when the target device receives a haptic parameter through the haptic parameter interface, to control vibration of the target device, a haptic description parameter in the target haptic description information needs to be converted, based on a preset conversion protocol, into a haptic parameter adapted to the haptic parameter interface. When the target device receives the haptic description information through the haptic description information interface, to control the target device to vibrate, the target haptic description information may be directly transmitted to the haptic description information interface. When the target device receives a haptic unit in the target haptic description information through a haptic unit interface, the target haptic description information may be parsed into each haptic unit, so that each haptic unit may be transmitted to the haptic unit interface in the target device.

Operation S4: Transmit the target haptic execution information to the target device, so that the target device vibrates according to the target haptic execution information.

In the haptic control method provided by some embodiments of this application, the target haptic description information is processed based on the haptic support information of the target device, to obtain the target haptic execution information adapted to the target device, and then a target haptic interface of the target device is called according to the target haptic execution information, so that the target device vibrates to achieve a target haptic effect. According to the technical solutions provided by this application, the target haptic description information may be processed according to the haptic support information of different devices, to obtain haptic execution information adapted to haptic interfaces of the devices, so that the different devices can achieve the same haptic effect, thereby resolving the problem that devices are incompatible with a haptic effect.

In some embodiments, the present disclosure further provides a haptic control method. In the haptic control method, a target device further includes a haptic effect adjustment and control interface.

In some embodiments, the haptic control method may include the following steps:

obtaining haptic support information of the target device;

obtaining target haptic description information, the target haptic description information being used to describe a haptic special effect in a target scenario; in a case that the haptic support information is a haptic parameter supported by the target device through a haptic parameter interface, determining a target provider that provides the haptic parameter interface; determining a target conversion protocol according to the target provider; converting the haptic description parameter into the haptic parameter according to the target conversion protocol; receiving haptic effect adjustment and control information; transmitting the haptic effect adjustment and control information and the haptic parameter to the haptic effect adjustment and control interface, so that the haptic effect adjustment and control interface performs adjustment and control processing on the haptic parameter according to the haptic effect adjustment and control information to obtain an adjusted and controlled haptic parameter; and transmitting the adjusted and controlled haptic parameter to the haptic parameter interface of the target device, so that the target device vibrates according to the adjusted and controlled haptic parameter.

The haptic adjustment and control information is parameter information that can be used to adjust and control the haptic parameter, for example, parameter information that can be used to adjust and control any haptic related parameter, for example, a haptic frequency, a haptic intensity, a haptic time, a number of haptic loops, or a haptic loop interval, of the haptic parameter. This is not limited in the present disclosure.

The haptic adjustment and control information may be received by the target device from an external environment, or may be transmitted by a target application program. A source of the haptic adjustment and control information is not limited in the present disclosure.

In a case that the haptic adjustment and control information is received by the target device from the external environment, the haptic adjustment and control information may be input by a user by using some controls on the target device, for example, input by using a button that comes with the target device, or input by using some controls in some application programs on the target device (for example, the haptic adjustment and control information may be input by tapping a "XX haptic control" control on a setting function user interface (UI) page of the target device). This is not limited in the present disclosure.

In some embodiments, the haptic effect adjustment and control interface may include multiple interfaces, for example, may include a haptic frequency scaling interface, haptic frequency adjustment and control information, a haptic loop playback interface, and a haptic switch interface. The haptic parameter may include a haptic frequency parameter, and the adjusted and controlled haptic parameter may include a scaled haptic frequency parameter. In this case, that the haptic effect adjustment and control interface performs adjustment and control processing on the haptic parameter according to the haptic effect adjustment and control information to obtain an adjusted and controlled haptic parameter may include the following step: performing, by the haptic frequency scaling interface, scaling processing on the haptic frequency parameter according to the haptic frequency adjustment and control information to obtain the scaled haptic frequency parameter.

A value range of a haptic frequency adjustment and control parameter may be 1 to 100, where 1 is a minimum value, and 100 is a maximum value.

When a value of the haptic frequency adjustment and control information in the haptic effect adjustment and control information is N, the haptic parameter M may be adjusted by using a formula $J=N/S\times M$, to obtain the scaled haptic frequency parameter J.

J is an integer within the value range of the haptic parameter, for example, may be an integer greater than or equal to 1 and less than or equal to 100. M is an integer within the value range of the haptic parameter, for example, may be an integer greater than or equal to 1 and less than or equal to 100. N is an integer within the value range of the haptic frequency adjustment and control parameter, for example, may be an integer greater than or equal to 1 and less than or equal to 100. S is a maximum value within the value range of the haptic frequency adjustment and control parameter, for example, 100.

In some embodiments, the haptic frequency scaling interface may be defined in the following function form: public void updateFrequency(int freq) { }, where public void updateFrequency may be an interface name, and int freq may be the haptic frequency adjustment and control information.

In some embodiments, the haptic effect adjustment and control interface may include a haptic intensity scaling interface, the haptic effect adjustment and control information may include haptic intensity adjustment and control information, the haptic parameter may include a haptic intensity parameter, and the adjusted and controlled haptic parameter may include a scaled haptic intensity parameter. In this case, that the haptic effect adjustment and control interface performs adjustment and control processing on the haptic parameter according to the haptic effect adjustment and control information to obtain an adjusted and controlled haptic parameter may include the following step: performing, by the haptic intensity scaling interface, scaling processing on the haptic intensity parameter according to the haptic intensity adjustment and control information to obtain the scaled haptic intensity parameter.

A value range of a haptic intensity adjustment and control parameter may be 1 to 255, where 1 is a minimum value, and 255 is a maximum value.

When a value of the haptic intensity adjustment and control information in the haptic effect adjustment and control information is n, the haptic parameter M may be adjusted by using a formula $j=n/s \times m$, to obtain the scaled haptic intensity parameter j.

j is an integer within the value range of the haptic parameter, for example, may be an integer greater than or equal to 1 and less than or equal to 100. m is an integer within the value range of the haptic parameter, for example, may be an integer greater than or equal to 1 and less than or equal to 100. n is an integer within the value range of the haptic intensity adjustment and control parameter, for example, may be an integer greater than or equal to 1 and less than or equal to 255. s is a maximum value within the value range of the haptic intensity adjustment and control parameter, for example, 255.

In some embodiments, the haptic intensity scaling interface may be defined in the following function form: public void updateAmplitude(int amplitude) { }, where public void updateAmplitude may be an interface name, and int amplitude may be the haptic intensity adjustment and control information.

In some embodiments, the haptic effect adjustment and control interface may include a haptic playback interface. In this case, the transmitting the haptic parameter to the haptic parameter interface of the target device, so that the target device vibrates according to the haptic parameter may include the following steps: obtaining a number of haptic loops and a haptic loop interval; and transmitting the haptic parameter, the number of haptic loops, and the haptic loop interval to the haptic effect adjustment and control interface, so that the haptic effect adjustment and control interface controls the haptic parameter interface according to the haptic parameter, the number of haptic loops, and the haptic loop interval, so as to control the target device to vibrate according to the haptic parameter, the number of haptic loops, and the haptic loop interval.

In some other embodiments, when the target device receives haptic stop information, the target device transmits the haptic stop information to the haptic playback interface, so that the haptic playback interface controls, through the haptic parameter interface, the target device not to vibrate.

In another embodiment, in a case that the target device does not vibrate, when the target device receives haptic start information, the target device transmits the haptic start information to the haptic playback interface, so that the haptic playback interface controls, through the haptic parameter interface, the target device to be able to vibrate.

In some embodiments, the haptic playback interface may be defined in the following function form: public void start (int loop, int interval, int amplitude, int freq) { }, where public void start may be a function name, int loop may be the number of loops, int interval may be the loop interval, int amplitude may be the haptic intensity parameter, and int freq may be the haptic frequency parameter.

It can be understood that the haptic intensity parameter int amplitude and the haptic frequency parameter int freq generally come from the haptic parameter or the adjusted and controlled haptic parameter. The number of loops int loop and the loop interval int interval generally have default values. Parameter values of the number of loops int loop and the loop interval int interval on the haptic playback interface are modified only when a new number of loops or a new loop interval are obtained.

In the technical solution provided in this embodiment, on the one hand, the same haptic description information can be converted into target haptic execution information by using a protocol, to achieve the same haptic effect on different devices. On the other hand, with the haptic effect adjustment and control information, one haptic effect library can be used to achieve completely different haptic effects in different scenarios and different hardware system settings, so that people with different hardware and sensitivity can achieve optimal experience. With the haptic effect adjustment and control information, an effect scaling function can be supported in an application that originally supports vibration only by aligning new interface parameters on a UI switch. Therefore, research and development migration costs are low. To sum up, haptic effect scaling is no longer supported only by using a previous single haptic switch. Regardless of UI settings or a more complex application scenario, a better effect can be presented through vibration to stimulate abundant expressions of haptic creativity of applications.

Figure 5:
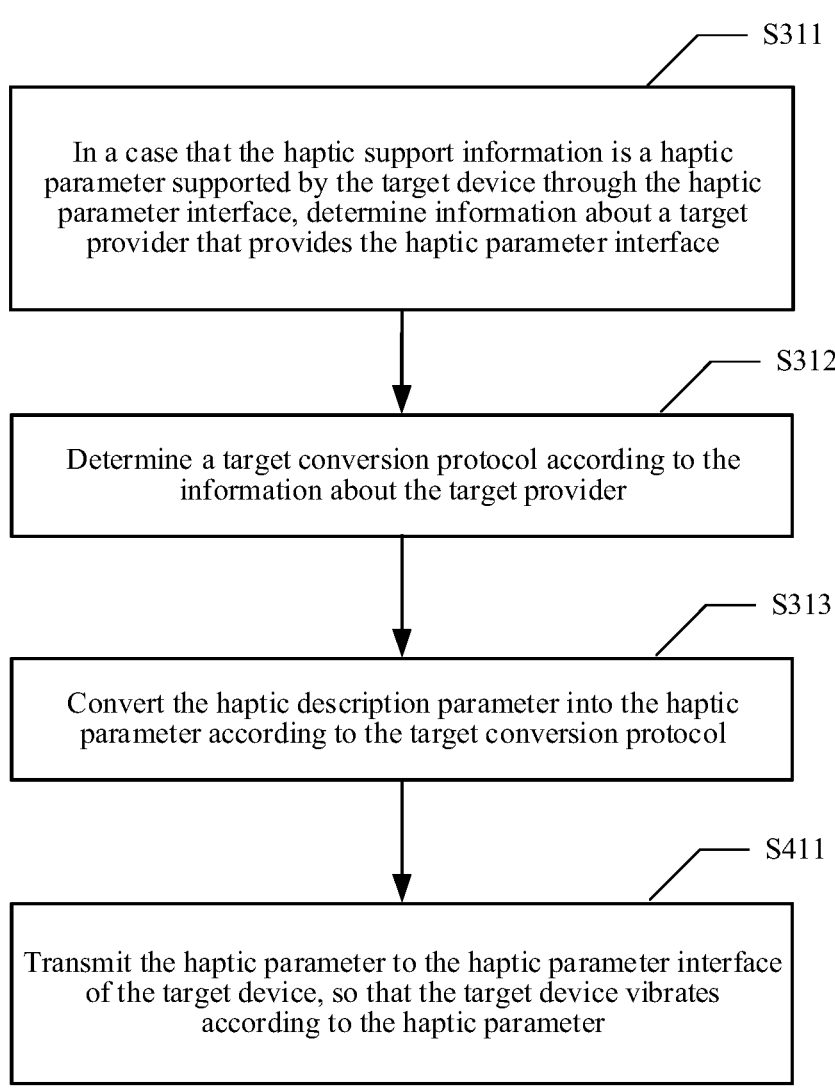
FIG. 5 is a flowchart of a haptic control method according to some embodiments.

FIG. 5 is a flowchart of operation S3 and operation S4 in FIG. 3 according to some embodiments.

In some embodiments, the target haptic description information may describe the target haptic effect through the haptic description parameter. The haptic description parameter may be a specific parameter that describes vibration (for example, a haptic sharpness is XX Hz), or may be an abstract parameter that describes vibration (for example, a haptic sharpness is XX level).

In some embodiments, the haptic description parameter in the target haptic description information includes: at least one of a haptic duration, a haptic intensity, a haptic sharpness, a haptic acceleration, a haptic enhancement time (the target device accelerates at a particular haptic acceleration in the haptic enhancement time), and a haptic decay time (the target device decelerates at a particular haptic acceleration in the haptic decay time).

In some embodiments, input parameters of the haptic parameter interface may be some specific parameter values (for example, a haptic sharpness is XX Hz and a haptic time is XX seconds).

In some embodiments, the target haptic execution information may be a haptic parameter that can be adapted to the haptic parameter interface of the target device.

Referring to FIG. 5, operation S3 in FIG. 3 may include the following operations.

Operation S311: In a case that the haptic support information is a haptic parameter supported by the target device through the haptic parameter interface, determine a target provider that provides the haptic parameter interface.

In some embodiments, the haptic parameter interface in the target device may be provided by a device provider of the target device (for example, versions later than Apple mobile phone IOS 13.0), or provided by a motor provider of the motor in the target device (the motor provider designs and provides the haptic parameter interface for the target device).

In some embodiments, different haptic parameter interfaces may support different types of haptic parameters. For example, some haptic parameter interfaces may support character-string-type haptic parameters, and some haptic parameter interfaces may support file-type haptic parameters. For example, some haptic parameter interfaces may support haptic parameters of a yml file type, and some haptic parameter interfaces may support haptic parameters of a JOSON file type.

In addition, definitions of a haptic intensity and a haptic sharpness in different haptic parameter interfaces may be different from those in the target haptic description information.

Therefore, a haptic description parameter in the target haptic description information needs to be converted into a haptic parameter adapted to the haptic parameter interface.

In some embodiments, some conversion protocols may be stored in advance to convert the haptic description parameter in the target haptic description information into a haptic parameter supported by the haptic parameter interface. When necessary, a file format of the target haptic description information needs to be converted into a file format supported by the haptic parameter interface of the target device.

In some embodiments, a protocol for conversion between the file type of the target haptic description information and the file type supported by the haptic parameter interface may be stored in advance, and a protocol for conversion between the haptic description parameter in the target haptic description information and the haptic parameter may be stored. For example, the conversion protocol may convert the target haptic description information in JOSON format into a yml file supported by the haptic parameter interface, and convert the haptic description parameter in the target haptic description information into a haptic parameter supported by the haptic parameter interface (for example, if a haptic sharpness in the haptic parameter interface is the second level and has the same haptic effect as that described by the haptic sharpness of 12 Hz in the target haptic description information, the haptic description parameter in the target haptic description information, that is, the haptic sharpness of 12 Hz, needs to be converted into a haptic parameter, that is, the haptic sharpness of the second level. For another example, if the haptic sharpness in the haptic parameter interface is 12 Hz and has the same haptic effect as that described in the haptic sharpness of 13 Hz in the target haptic description information, the haptic sharpness of 13 Hz in the target haptic description information needs to be converted into the haptic parameter, that is, the haptic sharpness of 12 Hz).

It can be understood that this application does not limit content, a format, and the like of the conversion protocol, which may be set according to actual needs.

In some embodiments, the conversion protocol may be associated with the target provider of the haptic parameter interface to determine the target conversion protocol when the target provider is known.

Operation S312: Determine a target conversion protocol according to the target provider.

In some embodiments, since different conversion protocols have been stored in advance for different target providers, after the target provider is determined, the target conversion protocol may be determined.

However, in actual operation, even if haptic interfaces are provided by device providers, final haptic parameter interfaces may be different due to different device providers, different service systems, different device models, and the like. Therefore, different conversion protocols need to be set for different device providers, different device models, and different service systems.

In some embodiments, the target conversion protocol may include a first conversion protocol and a second conversion protocol, where the first conversion protocol is a conversion protocol set for a haptic parameter interface provided by a device provider, and the second conversion protocol is a conversion protocol set for a haptic parameter interface provided by a motor provider.

In some embodiments, if the target provider is a device provider, the target conversion protocol may be determined by the following operations:

obtaining target model information of the target device, device provider information of the target device, and target service system information in the target device; and determining the first conversion protocol according to the target model information, the device provider information, and the target service system information, so as to convert the haptic description parameter into the haptic parameter according to the first conversion protocol.

In some embodiments, if the target provider is a motor provider, the target conversion protocol may be determined by the following operation: determining a second conversion protocol according to the motor provider information, so as to convert the haptic description parameter into the haptic parameter according to the second conversion protocol.

Operation S313: Convert the haptic description parameter into the haptic parameter according to the target conversion protocol.

In some embodiments, a file format of the target haptic description information may be converted, based on the target conversion protocol, into a file format supported by the haptic parameter interface of the target device, and the system description parameter in the target haptic description information may be converted into a haptic parameter supported by the haptic parameter interface.

Referring to FIG. 5, operation S4 in FIG. 3 may include the following operation.

Operation S411: Transmit the haptic parameter to the haptic parameter interface of the target device, so that the target device vibrates according to the haptic parameter.

In some other embodiments, the target haptic parameter interface of the target device may not be capable of supporting all haptic parameters converted from the haptic description parameter, for example, the IOS 10 system may not be capable of supporting complex haptic parameters (the system may be capable of supporting only a haptic intensity, but cannot support a parameter such as a haptic decay time). In this case, vibration may be simulated by the following operations.

Assuming that the haptic parameter includes a first haptic parameter and a second haptic parameter, the first haptic parameter is adapted to the haptic parameter interface, and the second haptic parameter is not adapted to the haptic parameter interface, the vibration may be simulated by the following operations:

performing conversion processing on the haptic description parameter according to the target conversion protocol, to obtain the first haptic parameter; and transmitting the first haptic parameter to the haptic parameter interface of the target device, so that the target device vibrates according to the first haptic parameter, so as to simulate the target haptic effect.

In the technical solution provided in some embodiments, on the one hand, the target conversion protocol is simply and conveniently determined based on the target provider information, and on the other hand, the target haptic description parameter is converted, based on the target conversion protocol, into the haptic parameter adapted to the haptic parameter interface, to control the target device to vibrate to achieve the target haptic effect.

FIG. 6 is a flowchart of operation S3 and operation S4 in FIG. 3 according to some embodiments.

In some embodiments, the target haptic description information may include at least one haptic unit, and each haptic unit describes a haptic effect.

In some embodiments, the target haptic interface of the target device may be a haptic unit interface, and the haptic unit interface may be an interface provided by a service system or an interface provided by a motor manufacturer.

In some embodiments, an input parameter of the haptic unit interface may be a haptic unit.

Referring to FIG. 6, operation S3 in FIG. 3 may include the following operation.

Operation S321: In a case that the haptic support information is a haptic unit supported by the target device through the haptic unit interface, parse out each haptic unit from the target haptic description information.

Referring to FIG. 6, operation S4 in FIG. 3 may include the following operation.

Operation S421: Transmit each haptic unit that is parsed out to the haptic unit interface of the target device, so that the target device vibrates according to each haptic unit that is parsed out.

In some embodiments, although the input parameter of the haptic unit interface may be a haptic unit, a file type supported by the haptic unit interface may be different from that of the target haptic description information. Therefore, when each haptic unit is transmitted to the haptic unit interface, each haptic unit may need to be converted into a file type supported by the haptic unit interface.

In the technical solution provided by some embodiments, the target description information is parsed into multiple haptic units, and then the haptic unit interface of the target device is called through the haptic unit, so that the target device vibrates to achieve the target haptic effect.

FIG. 7 is a flowchart of operation S3 and operation S4 in FIG. 3 according to some embodiments.

In some embodiments, the target haptic interface of the target device may be a haptic description information interface, and the haptic description information interface may be an interface provided by a service system or an interface provided by a motor manufacturer.

In some embodiments, the input parameter of the haptic description information interface may be haptic description information, and the haptic description information may be file-type description information or character-string-type description information.

In some embodiments, when the haptic description information is file-type description information, and the haptic support information is file-type haptic description information supported by the target device through the haptic description information interface, operation S3 in FIG. 3 may include the following operation:

Operation S331: Obtain a target path and a target handle of the target haptic description information.

Operation S4 in FIG. 3 may include the following operation:

Operation S432: Transmit the target haptic description information, the target path, or the target handle to the haptic description information interface of the target device, so that the target device vibrates according to the target haptic description information.

In some embodiments, the target haptic description information may be obtained based on the target haptic description information, the target path of the target haptic description information, or the target handle of the target haptic description information, and the haptic description information interface may be called based on the target haptic description information, so that the target device vibrates to achieve the target haptic effect.

In some embodiments, although the input parameter of the haptic description information interface may be haptic description information, a file type supported by the haptic description information interface may be different from that of the target haptic description information. Therefore, when the target description text is transmitted to the haptic description information interface, the target haptic description information may need to be converted into a file type supported by the haptic description information interface.

In some embodiments, when the haptic description information is character-string-type description information, and the haptic support information is character-string-type haptic description information supported by the target device through the haptic description information interface, the target character-string-type haptic description information may be transmitted to the haptic description information interface of the target device, so that the target device achieves a target haptic effect according to the target character-string-type haptic description information.

In the technical solution provided by some embodiments, the haptic unit interface of the target device is called based on the target haptic description information, so that the target device achieves the target haptic effect.

Figure 8:
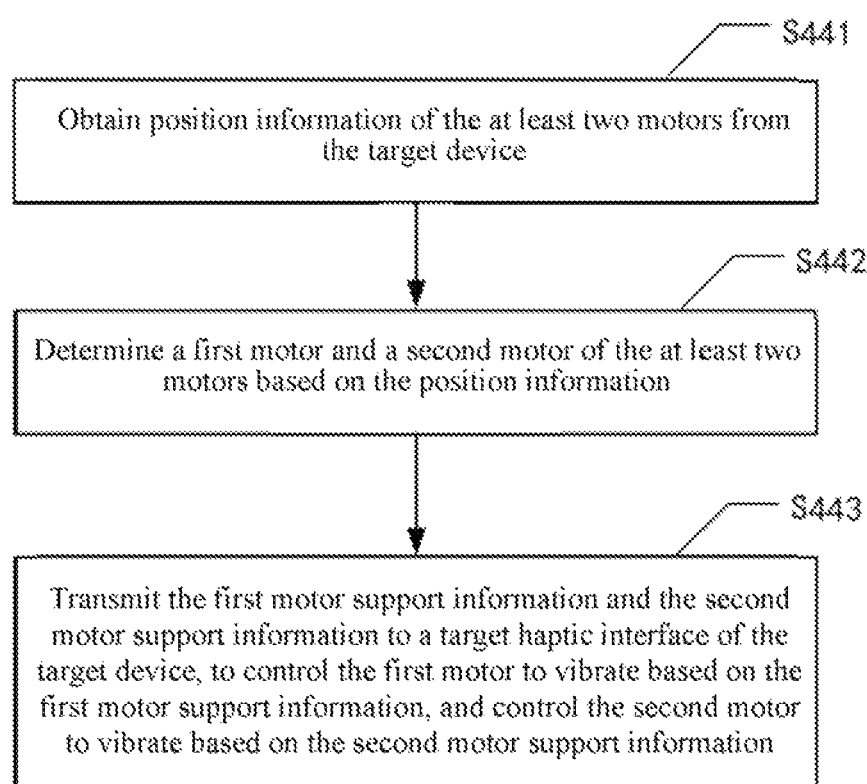
FIG. 8 is a flowchart of a haptic control method according to some embodiments.

FIG. 8 is a flowchart of operation S4 in FIG. 3 according to some embodiments.

In some embodiments, the target device may include at least two motors, and the haptic description information correspondingly includes description information that describes the at least two motors. Therefore, the haptic support information also includes support information of the at least two motors, for example, may include first motor support information and second motor support information.

Referring to FIG. 8, operation S4 in FIG. 3 may include the following operation:

Operation S441: Obtain position information of the at least two motors from the target device.

Figure 9:
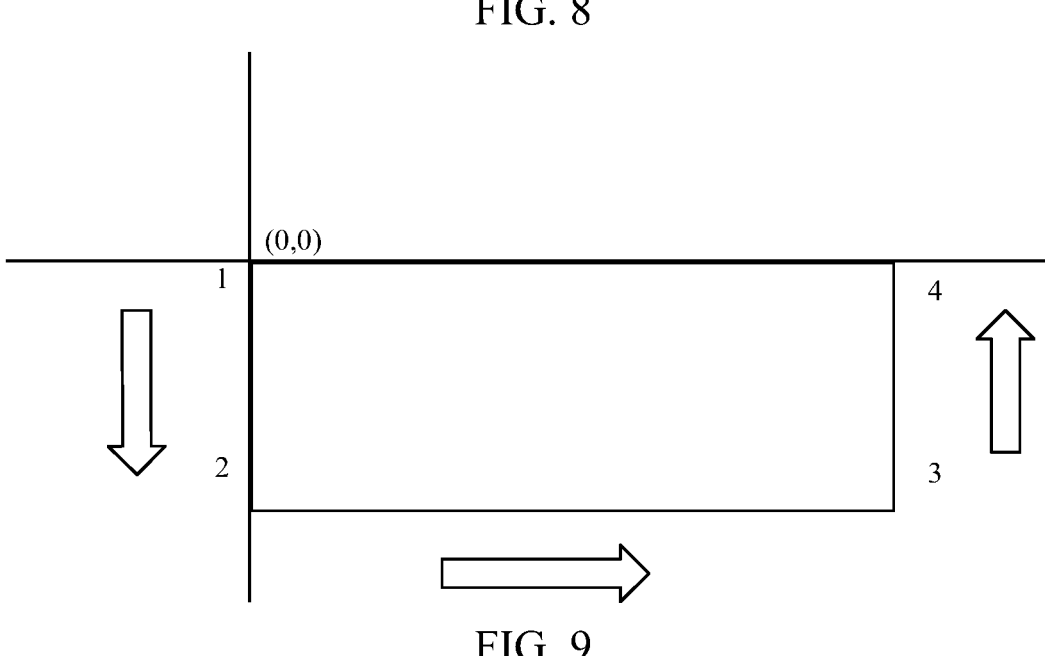
FIG. 9 is a schematic diagram of determining a target direction according to some embodiments.

In some embodiments, the position information may be coordinate information of the motor in a target space coordinate system, where the target space coordinate system may be a coordinate system that may include all entities of the target device, such as a space coordinate system in FIG. 9.

Operation S442: Determine a first motor and a second motor of the at least two motors based on the position information.

In some embodiments, a target direction may be first determined in the target space coordinate system, and the target direction may be, for example, along a particular coordinate axis and use the origin as a start point, or the counterclockwise direction is used as the target direction.

As shown in FIG. 9, the coordinate origin 1 may be used as the start point, and motors in the target device are marked in the counterclockwise direction, to sequentially determine the first motor and the second motor and the like.

The motors determined in the above method can ensure that the haptic effect is the same regardless of whether the target device is in landscape mode or portrait mode, that is, vibration of the same effect is performed in the same orientation (for example, the same orientation of the display screen of the device).

Operation S443: Transmit the first motor support information and the second motor support information to a target haptic interface of the target device, to control the first motor to vibrate based on the first motor support information, and control the second motor to vibrate based on the second motor support information.

It can be understood that some embodiments only use the first motor and the second motor as an example, and the target device may also have a third motor, a fourth motor, and the like. A haptic control method of the third motor and the fourth motor is similar to that in some embodiments.

In the technical solution provided by some embodiments, on the one hand, the at least two motors are encoded based on the position information of the at least two motors, so that no matter how the target device changes (landscape mode or portrait mode), the first motor does not change relative to a relative position of the screen of the device (for example, the first motor is always close to the upper left corner of the screen, and the second motor is always far away from the upper left corner of the screen). On the other hand, the first motor is controlled based on the first motor support information, and the second motor is controlled based on the second motor support information, so that no matter how the target device changes, the overall haptic effect of the motor does not change.

Figures 10, 11:
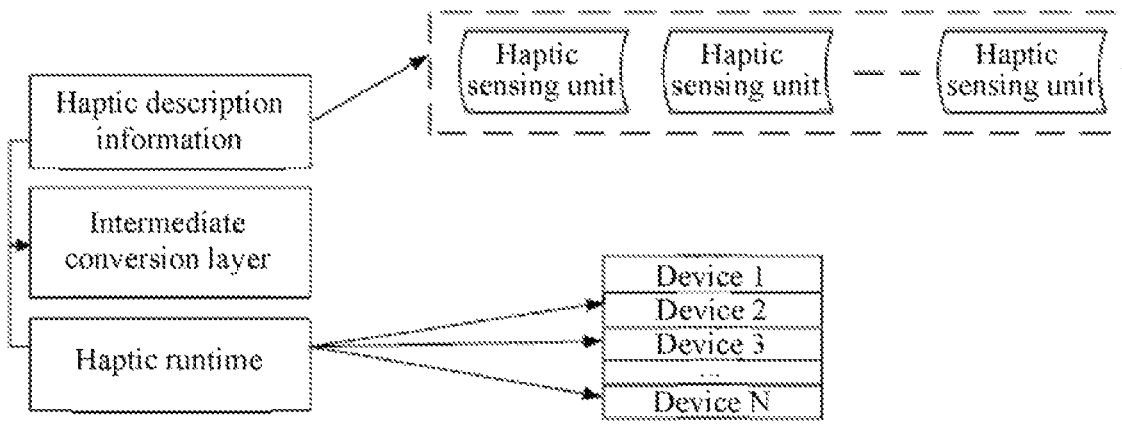
FIG. 10 is a framework diagram of haptic control according to some embodiments.
FIG. 11 is a schematic diagram of a haptic effect according to some embodiments.

FIG. 10 is a framework diagram of haptic control according to some embodiments. Referring to FIG. 10, the framework diagram of haptic control may include haptic description information, an intermediate conversion layer (TGPA), and a haptic runtime (HR) unit in the target application. The haptic description information may include multiple haptic units.

In some embodiments, in the target application, the haptic description information may be exchanged with the intermediate conversion layer through a game haptic effect interface (HEI). The intermediate conversion layer may exchange information with each device in the haptic runtime unit through a haptic runtime interface (HRI) interface.

In some embodiments, the haptic runtime service interface may specifically include the following interfaces:

1. getVendorSupportStrategy:

Function: Query the haptic support information of the target device

Return: Return whether to support and a number of motors of the target device.

2. hrPlayUnit:

Function: Play a haptic unit 3. hrPlayEffects:

Function: Play haptic description information 4. hrStop:

Function: stop playing a haptic effect

In some embodiments, the game haptic effect interface may specifically include the following interfaces:

5. isHeSupport:

Function: Determine whether to support game haptic description

Interface provider: TGPA

Caller: target application 6. hePlay (file):

Function: Play a haptic effect description file, which is not loop playback by default (support loop playback)

Interface provider: TGPA

Interface caller: target application 7. hePlay (string):

Function: Play a haptic description information character string

Interface provider: TGPA

Interface caller: target application 8. heStop:

Function: stop playing a haptic effect

Interface provider: TGPA

Interface caller: target application

FIG. 11 is a schematic diagram of a haptic effect according to some embodiments. With reference to the framework diagram of haptic control shown in FIG. 10, the haptic control method may include the following operations.

When a target application 1101 is started, an intermediate conversion layer 1102 first performs initialization communication with a target device 1103 through a getVendorSupportStrategy interface, to obtain haptic support information of the target device 1103. If the target application 1101 needs a haptic service, the target application 1101 initiates a haptic service support request to the intermediate conversion layer 1102 through an isHeSupport interface, to determine whether the current device supports the playback of the haptic effect, and the intermediate conversion layer 1102 returns a haptic support result of the current device. If the target device 1103 supports vibration, the target application 1101 transmits the target haptic description information to the intermediate conversion layer 1102 through a hePlay (string) or hePlay (file) interface. The intermediate conversion layer 1102 processes the target haptic description information according to the haptic support information of the target device 1103, to obtain target haptic execution information. The intermediate conversion layer 1102 transmits the target haptic execution information to a target haptic interface of the target device 1103 through hrPlayUnit, hrPlayEffects, or the like, so that the target device 1103 achieves a target haptic effect according to the target haptic execution information. When the target application 1101 obtains a haptic stop parameter (that is, a target stop parameter), the target stop parameter may be transmitted to the intermediate conversion layer 1102 through heStop. The intermediate conversion layer 1102 then transmits the target stop parameter to the target device 1103 through an hrStop interface, so as to control the target device 1103 to stop vibrating.

In some embodiments, That the intermediate conversion layer 1102 processes the target haptic description information according to the haptic support information of the target device 1103, to obtain target haptic execution information may include the following cases:

1. If the haptic support information of the target device 1103 is that the target device 1103 supports a haptic parameter through the haptic parameter interface, a target provider that provides the haptic parameter interface is obtained (the haptic parameter interface may be provided by a motor manufacturer, a mobile phone manufacturer, or other manufacturers, and this application does not limit the provider of the haptic parameter interface), the target conversion protocol is determined according to the target provider, and then the haptic description parameter is converted into a haptic parameter according to the target conversion protocol, so as to transmit the haptic parameter to the haptic parameter interface of the target device 1103, so that the target device 1103 achieves the target haptic effect according to the haptic parameter.

2. If the haptic support information of the target device 1103 is that the target device 1103 supports a haptic unit through a haptic unit interface, each haptic unit is parsed from the target haptic description information. Then, each haptic unit that is parsed out is transmitted to the haptic unit interface of the target device 1103, so that the target device 1103 plays each haptic unit to perform the target haptic effect.

3. If the haptic support information of the target device 1103 is that the target device 1103 supports haptic description information through a haptic description information interface, the target haptic description information is directly transmitted to the haptic description information interface of the target device 1103, so that the target device 1103 plays the target haptic description information to achieve the target haptic effect.

In some embodiments, That the target application 1101 transmits the target haptic description information to the intermediate conversion layer 1102 may include the following cases:

In some embodiments, after the target application 1101 initiates a haptic service support request to the intermediate conversion layer 1102 through an isHeSupport interface, the target application 1101 may obtain the haptic support information of the target device 1103, and the target application 1101 may transmit the target haptic description information to the intermediate conversion layer 1102 according to the haptic support information of the target device 1103.

For example, if the haptic support information is that the target device 1103 supports file-type haptic description information, target file-type haptic description information is transmitted to the intermediate conversion layer 1102. If the haptic support information of the target device 1103 is that the target device 1103 supports character-string-type haptic description information, target character-string-type haptic description information is transmitted to the intermediate conversion layer 1102.

The target file-type haptic description information may be haptic description text information in formats such as JOSON, yml, and xml.

In the technical solution provided by some embodiments, the target haptic description information is processed based on the haptic support information of the target device, to obtain the target haptic execution information adapted to the target device, and then a target haptic interface of the target device is called according to the target haptic execution information, so that the target device achieves a target haptic effect. According to the technical solutions provided by this application, the target haptic description information may be processed according to the haptic support information of different devices, to obtain haptic execution information adapted to haptic interfaces of the devices, so that the different devices may achieve the same haptic effect.

Figure 12:
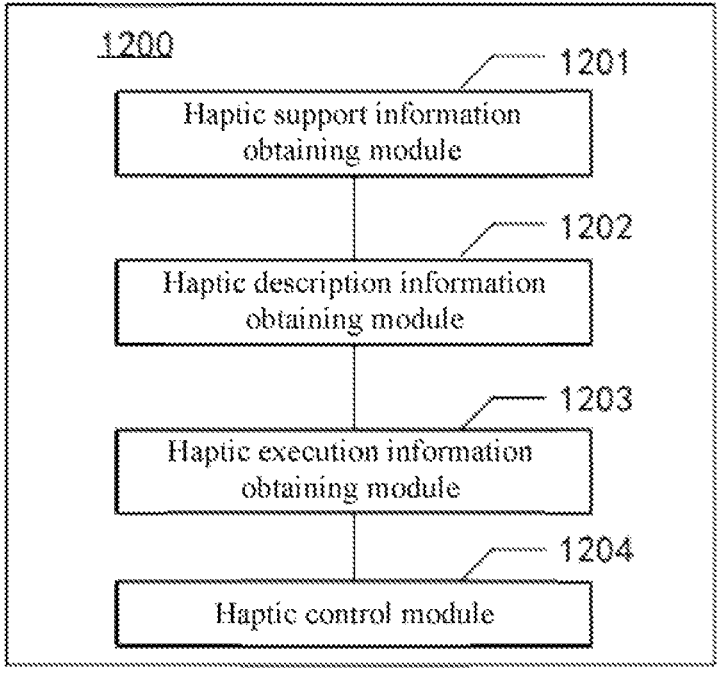
FIG. 12 is a block diagram of a haptic control apparatus according to some embodiments.

FIG. 12 is a block diagram of a haptic control apparatus according to some embodiments. Referring to FIG. 12, the haptic control apparatus 1200 provided in some embodiments may include: a haptic support information obtaining module 1201, a haptic description information obtaining module 1202, a haptic execution information obtaining module 1203, and a haptic control module 1204.

The haptic support information obtaining module 1201 may be configured to obtain haptic support information of a target device; the haptic description information obtaining module 1202 may be configured to obtain target haptic description information, the target haptic description information being used to describe a haptic special effect in a target scenario; the haptic execution information obtaining module 1203 may be configured to perform conversion processing on the target haptic description information according to the haptic support information, to obtain target haptic execution information; and the haptic control module 1204 may be configured to transmit the target haptic execution information to the target device, so that the target device vibrates according to the target haptic execution information.

In some embodiments, the target haptic description information includes a haptic description parameter, a target haptic interface includes a haptic parameter interface, and the target haptic execution information includes a haptic parameter.

In some embodiments, the haptic execution information obtaining module 1203 may include: a target provider determining unit, a target conversion protocol determining unit, and a haptic parameter obtaining unit, and the haptic control module 1204 may include a first control unit.

The target provider determining unit may be configured to: in a case that the haptic support information is a haptic parameter supported by the target device through the haptic parameter interface, determine a target provider that provides the haptic parameter interface. The target conversion protocol determining unit may be configured to determine a target conversion protocol according to the target provider. The haptic parameter obtaining unit may convert the haptic description parameter into the haptic parameter according to the target conversion protocol. The first control unit may be configured to transmit the haptic parameter to the haptic parameter interface of the target device, so that the target device vibrates according to the haptic parameter.

In some embodiments, the first control unit may include: a haptic effect adjustment and control information receiving subunit configured to receive haptic effect adjustment and control information; a control subunit configured to transmit the haptic effect adjustment and control information and haptic parameter to the haptic effect adjustment and control interface, so that the haptic effect adjustment and control interface performs adjustment and control processing on the haptic parameter according to the haptic effect adjustment and control information to obtain an adjusted and controlled haptic parameter; and a haptic control subunit configured to transmit the adjusted and controlled haptic parameter to the haptic parameter interface of the target device so that the target device vibrates according to the adjusted and controlled haptic parameter.

In some embodiments, the haptic effect adjustment and control interface may include a haptic frequency scaling interface, the haptic effect adjustment and control information may include haptic frequency adjustment and control information, the haptic parameter may include a haptic frequency parameter, and the adjusted and controlled haptic parameter may include a scaled haptic frequency parameter; wherein the control subunit may include a frequency control subunit configured to perform, by the haptic frequency scaling interface, scaling processing on the haptic frequency parameter according to the haptic frequency adjustment and control information to obtain the scaled haptic frequency parameter.

In some embodiments, the haptic effect adjustment and control interface may include a haptic intensity scaling interface, the haptic effect adjustment and control information may include haptic intensity adjustment and control information, the haptic parameter may include a haptic intensity parameter, and the adjusted and controlled haptic parameter may include a scaled haptic intensity parameter; wherein the control subunit may include an intensity control subunit configured to perform, by the haptic intensity scaling interface, scaling processing on the haptic intensity parameter according to the haptic intensity adjustment and control information to obtain the scaled haptic intensity parameter.

In some embodiments, the haptic effect adjustment and control interface includes a haptic playback interface; wherein the first control unit may include a playback obtaining subunit, configured to obtain a number of haptic loops and a haptic loop interval; and a playback transmission subunit, configured to transmit the haptic parameter, the number of haptic loops, and the haptic loop interval to the haptic effect adjustment and control interface, so that the haptic effect adjustment and control interface controls the haptic parameter interface according to the haptic parameter, the number of haptic loops, and the haptic loop interval, so as to control the target device to vibrate according to the haptic parameter, the number of haptic loops, and the haptic loop interval.

In some embodiments, the first control unit may include: a haptic stop information obtaining subunit, configured to receive haptic stop information, and a non-haptic control subunit configured to transmit the haptic stop information to the haptic playback interface, so that the haptic playback interface controls, through the haptic parameter interface, the target device not to vibrate.

In some embodiments, the haptic parameter includes a first haptic parameter and a second haptic parameter, the first haptic parameter is adapted to the haptic parameter interface, and the second haptic parameter is not adapted to the haptic parameter interface.

In some embodiments, the haptic parameter obtaining unit may include: a first haptic parameter obtaining subunit, configured to perform conversion processing on the haptic description parameter according to the target conversion protocol, to obtain the first haptic parameter. The first control unit may include: a first haptic parameter transmission subunit, configured to transmit the first haptic parameter to the haptic parameter interface of the target device, so that the target device simulates vibration according to the first haptic parameter.

In some embodiments, the target conversion protocol includes a first conversion protocol.

In some embodiments, the target conversion protocol determining unit may include: a device provider determining subunit and a first conversion protocol obtaining subunit;
the device provider determining subunit may be configured to: in a case that the target provider is a device provider of the target device, obtain target model information of the target device, device provider information of the target device, and target service system information in the target device; and the first conversion protocol obtaining subunit may be configured to determine the first conversion protocol according to the target model information, the device provider information, and the target service system information, so as to convert the haptic description parameter into the haptic parameter according to the first conversion protocol.

In some embodiments, the target conversion protocol includes a second conversion protocol.

In some embodiments, the target conversion protocol determining unit may include: a motor provider determining unit and a second conversion protocol determining unit;
the motor provider determining unit may be configured to: in a case that the target provider is a motor provider that provides a haptic parameter interface for the target device, obtain information about the motor provider that provides the haptic parameter interface; and the second conversion protocol determining unit may be configured to determine the second conversion protocol according to the information about the motor provider, so as to convert the haptic description parameter into the haptic parameter according to the second conversion protocol.

In some embodiments, the target haptic description information includes at least one haptic unit, and the target haptic interface includes a haptic unit interface.

In some embodiments, the haptic execution information obtaining module 1203 may include: an analysis unit, and the haptic control module 1204 may include: a third control unit;
the analysis unit may be configured to: in a case that the haptic support information is a haptic unit supported by the target device through the haptic unit interface, parse out each haptic unit from the target haptic description information; and the third control unit may be configured to transmit each haptic unit that is parsed out to the haptic unit interface of the target device, so that the target device vibrates according to each haptic unit that is parsed out.

In some embodiments, the target haptic interface includes a haptic description information interface, and the haptic execution information is the target haptic description information.

In some embodiments, the haptic control module may include: a fourth control unit.

The fourth control unit may be configured to: in a case that the haptic support information is haptic description information supported by the target device through the haptic description information interface, transmit the target haptic description information to the haptic description information interface of the target device, so that the target device may vibrate according to the target haptic description information.

In some embodiments, the haptic support information includes a first motor haptic parameter and a second motor haptic parameter.

In some embodiments, the target device includes at least two motors, and the haptic support information includes first motor support information and second motor support information.

In some embodiments, the haptic control module 1204 may include: a position information obtaining unit, a motor determining unit, and a motor control unit.

The position information obtaining unit may be configured to obtain position information of the at least two motors from the target device. The motor determining unit may be configured to determine a first motor and a second motor of the at least two motors based on the position information. The motor control unit may be configured to transmit the first motor support information and the second motor support information to a target haptic interface of the target device, to control the first motor to vibrate based on the first motor support information, and control the second motor to vibrate based on the second motor support information.

In some embodiments, the position information includes target coordinate information of the at least two motors in a target space coordinate system. The motor determining unit may include: a target direction determining subunit and a motor determining subunit.

The target direction determining subunit may be configured to determine a target direction in the target space coordinate system. The motor determining subunit may be configured to determine the first motor and the second motor of the at least two motors along the target direction according to the target coordinate information.

In some embodiments, the haptic description information obtaining module 1202 may include: a haptic service support request obtaining unit, a haptic support information returning unit, and a target haptic description information receiving unit.

The haptic service support request obtaining unit may be configured to receive a haptic service support request of a target application. The haptic support information returning unit may be configured to: based on the haptic service support request, return the haptic support information of the target device to the target application. The target haptic description information receiving unit may be configured to receive the target haptic description information returned by the target application based on the haptic support information.

In some embodiments, the target haptic description information includes file-type target haptic description information.

In some embodiments, the target haptic description information receiving unit may include: a file-type target haptic description information obtaining subunit.

The file-type target haptic description information acquisition subunit may be configured to: in a case that the haptic support information is file-type haptic description information supported by the target device, receive the file-type target haptic description information returned by the target application based on the haptic support information.

In some embodiments, the target haptic description information includes character-string-type target haptic description information.

In some embodiments, the target haptic description information receiving unit may include: a character-string-type target haptic description information obtaining subunit.

The character-string-type target haptic description information obtaining subunit may be configured to: in a case that the haptic support information is character-string-type haptic description information supported by the target device, receive the character-string-type target haptic description information returned by the target application based on the haptic support information.

In some embodiments, the haptic description parameter includes: at least one of a haptic duration, haptic intensity, haptic sharpness, a haptic acceleration, a haptic enhancement time, and a haptic decay time.

In some embodiments, the haptic control apparatus further includes: a stop parameter obtaining module and a haptic stop control module.

The stop parameter obtaining module may be configured to obtain a target stop parameter. The haptic stop control module may be configured to control, according to the target stop parameter, the target device to stop vibration.

Each functional module of the haptic control apparatus 1200 of some embodiments corresponds to the operation of some embodiments of the foregoing haptic control method, and therefore is not repeated herein.

Through the description of the foregoing embodiments, a person skilled in the art can easily understand that the embodiments described herein may be implemented by software, or may be implemented by combining software with necessary hardware. Therefore, the technical solutions of some embodiments may be implemented in a form of a software product. The software product may be stored in a non-volatile storage medium (which may be a CD-ROM, a USB flash drive, a removable hard disk, or the like), including several instructions for instructing a computing device (which may be a personal computer, a server, a mobile terminal, a smart device, or the like) to perform the methods according to some embodiments, such as one or more of the operations shown in FIG. 3.

In addition, the foregoing accompanying drawings are only schematic illustrations of the processing included in the method according to some embodiments, and are not intended for limitation. It is easily understood that the processes illustrated in the foregoing accompanying drawings do not indicate or define the chronological order of these processes. In addition, it is also easily understood that these processes may be performed, for example, synchronously or asynchronously in a plurality of modules.

After considering the specification and implementing the present disclosure, a person skilled in the art can readily think of other embodiments. The disclosure is intended to cover any variations, uses, or adaptive changes of the disclosure. These variations, uses, or adaptive changes follow the general principles of the disclosure and include common general knowledge or common technical means in the art, which are not applied for in the disclosure. The specification and the embodiments are merely considered as examples, and the actual scope and the spirit of the disclosure are stated in the claims.

It should be understood that the disclosure is not limited to the detailed structures, configurations or implementation methods shown herein. On the contrary, the disclosure is intended to cover various modifications and equivalent configurations within the spirit and scope of the appended claims.

What is claimed is:

1. A haptic control method, executed by an electronic device, comprising:

obtaining, from a target parameter interface of a target device, haptic support information of the target device;

obtaining, in association with execution of a target application, target haptic description information, the target haptic description information being used to describe a haptic special effect in a target scenario that occurs during execution of the target application;

performing conversion processing on the target haptic description information according to the haptic support information to adjust one or more parameters included in the haptic support information to obtain target haptic execution information, the target haptic execution information comprising a haptic parameter;

transmitting the haptic parameter to the target parameter interface of the target device, so that the target device is configured to vibrate according to the haptic parameter;

receiving haptic effect adjustment and control information, the haptic effect adjustment and control information being information for adjusting at least one of a haptic frequency, a haptic intensity, a haptic time, a number of haptic loops, or a haptic loop interval, of the haptic parameter;

transmitting the haptic effect adjustment and control information and the haptic parameter to a haptic effect adjustment and control interface of the target device, so that the haptic effect adjustment and control interface performs adjustment and control processing on the haptic parameter according to the haptic effect adjustment and control information to obtain an adjusted and controlled haptic parameter; and transmitting the adjusted and controlled haptic parameter to a target haptic interface of the target device, so that the target device vibrates according to the adjusted and controlled haptic parameter.

2. The haptic control method according to claim 1, wherein the target haptic interface of the target device comprises a haptic parameter interface, and the performing comprises:

in a case that the haptic support information is a haptic parameter supported by the target device through the haptic parameter interface, determining a target provider that provides the haptic parameter interface, determining a target conversion protocol according to the target provider, and converting the haptic description parameter into the haptic parameter according to the target conversion protocol.

3. The haptic control method according to claim 2, wherein:

the haptic parameter comprises a first haptic parameter and a second haptic parameter, the first haptic parameter is adapted to the haptic parameter interface, and the second haptic parameter is not adapted to the haptic parameter interface;

the converting comprises:

performing conversion processing on the haptic description parameter according to the target conversion protocol, to obtain the first haptic parameter; and the transmitting the haptic parameter to the haptic parameter interface of the target device comprises:

transmitting the first haptic parameter to the haptic parameter interface of the target device, so that the target device simulates vibration according to the first haptic parameter.

4. The haptic control method according to claim 2, wherein the target conversion protocol comprises a first conversion protocol; and the determining a target conversion protocol according to the target provider comprises:

in a case that the target provider is a device provider of the target device, obtaining target model information of the target device, device provider information of the target device, and target service system information in the target device; and determining the first conversion protocol according to the target model information, the device provider information, and the target service system information, so as to convert the haptic description parameter into the haptic parameter according to the first conversion protocol.

5. The haptic control method according to claim 2, wherein the target conversion protocol comprises a second conversion protocol; and the determining a target conversion protocol according to the target provider comprises:

in a case that the target provider is a motor provider that provides a haptic parameter interface for the target device, obtaining information about the motor provider that provides the haptic parameter interface; and determining the second conversion protocol according to the information about the motor provider, so as to convert the haptic description parameter into the haptic parameter according to the second conversion protocol.

6. The haptic control method according to claim 1, wherein:

the haptic effect adjustment and control interface comprises a haptic frequency scaling interface; the haptic effect adjustment and control information comprises haptic frequency adjustment and control information; and the haptic parameter comprises a haptic frequency parameter; and the transmitting the haptic effect adjustment and control information and the haptic parameter comprises:

transmitting the haptic frequency adjustment and control information and the haptic frequency parameter to the haptic frequency scaling interface, so that the haptic frequency scaling interface performs scaling processing on the haptic frequency parameter according to the haptic frequency adjustment and control information to obtain the adjusted and controlled haptic parameter.

7. The haptic control method according to claim 1, wherein:

the haptic effect adjustment and control interface comprises a haptic intensity scaling interface; the haptic effect adjustment and control information comprises haptic intensity adjustment and control information; and the haptic parameter comprises a haptic intensity parameter; and the transmitting the haptic effect adjustment and control information and the haptic parameter comprises:

transmitting the haptic intensity adjustment and control information and the haptic intensity parameter to the haptic intensity scaling interface, so that the haptic intensity scaling interface performs scaling processing on the haptic intensity parameter according to the haptic intensity adjustment and control information to obtain the adjusted and controlled haptic parameter.

8. The haptic control method according to claim 1, wherein:

the haptic effect adjustment and control interface comprises a haptic playback interface; and the transmitting the haptic parameter to the haptic parameter interface of the target device comprises:

obtaining a number of haptic loops and a haptic loop interval; and transmitting the haptic parameter, the number of haptic loops, and the haptic loop interval to the haptic effect adjustment and control interface, so that the haptic effect adjustment and control interface controls the haptic parameter interface according to the haptic parameter, the number of haptic loops, and the haptic loop interval, so as to control the target device to vibrate according to the haptic parameter, the number of haptic loops, and the haptic loop interval.

9. The haptic control method according to claim 8, further comprising:

receiving haptic stop information; and transmitting the haptic stop information to the haptic playback interface, so that the haptic playback interface controls, through the haptic parameter interface, the target device not to vibrate.

10. The haptic control method according to claim 1, wherein the target haptic description information comprises at least one haptic unit, and the target haptic interface of the target device comprises a haptic unit interface;

the performing comprises:

in a case that the haptic support information is a haptic unit supported by the target device through the haptic unit interface, parsing out each haptic unit from the target haptic description information; and the transmitting the haptic parameter to the target haptic interface of the target device comprises:

transmitting each haptic unit to the haptic unit interface of the target device, so that the target device is capable of vibrating according to each haptic unit that is parse out.

11. The haptic control method according to claim 1, wherein: the target haptic interface of the target device comprises a haptic description information interface, and the haptic execution information is the target haptic description information; and the transmitting the haptic parameter to the target haptic interface of the target device comprises:

in a case that the haptic support information is haptic description information supported by the target device through the haptic description information interface, transmitting the target haptic description information to the haptic description information interface of the target device, so that the target device is capable of vibrating according to the target haptic description information.

12. The haptic control method according to claim 1, wherein: the target device comprises at least two motors, and the haptic support information comprises first motor support information and second motor support information; and the transmitting the haptic parameter to the target haptic interface of the target device comprises:

obtaining position information of the at least two motors from the target device;

identifying a first motor and a second motor of the at least two motors based on the position information; and transmitting the first motor support information and the second motor support information to the target haptic interface of the target device, to control the first motor to vibrate based on the first motor support information, and control the second motor to vibrate based on the second motor support information.

13. The haptic control method according to claim 12, wherein: the position information comprises target coordinate information of the at least two motors in a target space coordinate system; and the identifying the first motor and the second motor of the at least two motors based on the position information comprises:

establishing a target direction in the target space coordinate system; and identifying the first motor and the second motor of the at least two motors along the target direction according to the target coordinate information.

14. The haptic control method according to claim 1, wherein: the obtaining target haptic description information comprises:

receiving a haptic service support request from the target application;

based on the haptic service support request, returning the haptic support information of the target device to the target application; and receiving the target haptic description information returned by the target application based on the haptic support information.

15. The haptic control method according to claim 14, wherein: the target haptic description information comprises file-type target haptic description information; and the receiving the target haptic description information returned by the target application based on the haptic support information comprises:

in a case that the haptic support information is file-type haptic description information supported by the target device, receiving the file-type target haptic description information returned by the target application based on the haptic support information.

16. The haptic control method according to claim 15, wherein: the target haptic description information comprises character-string-type target haptic description information; and the receiving the target haptic description information returned by the target application based on the haptic support information comprises:

in a case that the haptic support information is character-string-type haptic description information supported by the target device, receiving the character-string-type target haptic description information returned by the target application based on the haptic support information.

17. A haptic control apparatus comprising:

at least one memory configured to store program code; and at least one processor configured to read the program code and operate as instructed by the program code, the program code comprising:

haptic support information obtaining code configured to cause the at least one processor to obtain, from a target parameter interface of a target device, haptic support information of the target device;

haptic description information obtaining code configured to cause the at least one processor to obtain, in association with execution of a target application, target haptic description information, the target haptic description information being used to describe a haptic special effect in a target scenario that occurs during execution of the target application;

haptic execution information obtaining code configured to cause the at least one processor to perform conversion processing on the target haptic description information according to the haptic support information to adjust one or more parameters included in the haptic support information to obtain target haptic execution information, the target haptic execution information comprising a haptic parameter; and control code configured to cause the at least one processor to:

transmit the haptic parameter to the target parameter interface of the target device, so that the target device is configured to vibrate according to the haptic parameter;

receive haptic effect adjustment and control information, the haptic effect adjustment and control information being information for adjusting at least one of a haptic frequency, a haptic intensity, a haptic time, a number of haptic loops, or a haptic loop interval, of the haptic parameter;

transmit the haptic effect adjustment and control information and the haptic parameter to a haptic effect adjustment and control interface of the target device, so that the haptic effect adjustment and control interface performs adjustment and control processing on the haptic parameter according to the haptic effect adjustment and control information to obtain an adjusted and controlled haptic parameter; and transmit the adjusted and controlled haptic parameter to a target haptic interface of the target device, so that the target device vibrates according to the adjusted and controlled haptic parameter.

18. The haptic control apparatus according to claim 17, wherein the target haptic interface comprises a haptic parameter interface; and the program code comprises:

target provider determining code configured to cause the at least one processor to, in a case that the haptic support information is a haptic parameter supported by the target device through the haptic parameter interface, determine a target provider that provides the haptic parameter interface, target conversion protocol determining code configured to cause the at least one processor to determine a target conversion protocol according to the target provider, and haptic parameter obtaining code configured to cause the at least one processor to convert the haptic description parameter into the haptic parameter according to the target conversion protocol.

19. A non-transitory computer-readable storage medium, storing computer code that when executed by at least one processor causes the at least one processor to:

obtain, from a target parameter interface of a target device, haptic support information of the target device;

obtain, in association with execution of a target application, target haptic description information, the target haptic description information being used to describe a haptic special effect in a target scenario that occurs during execution of the target application;

perform conversion processing on the target haptic description information according to the haptic support information to adjust one or more parameters included in the haptic support information to obtain target haptic execution information, the target haptic execution information comprising a haptic parameter;

transmit the haptic parameter to the target parameter interface of the target device, so that the target device is configured to vibrate according to the haptic parameter;

receive haptic effect adjustment and control information, the haptic effect adjustment and control information being information for adjusting at least one of a haptic frequency, a haptic intensity, a haptic time, a number of haptic loops, or a haptic loop interval, of the haptic parameter;

transmit the haptic effect adjustment and control information and the haptic parameter to a haptic effect adjustment and control interface of the target device, so that the haptic effect adjustment and control interface performs adjustment and control processing on the haptic parameter according to the haptic effect adjustment and control information to obtain an adjusted and controlled haptic parameter; and transmit the adjusted and controlled haptic parameter to a target haptic interface of the target device, so that the target device vibrates according to the adjusted and controlled haptic parameter.

\* \* \* \* \*